May 6, 1969 — M. BONNET — 3,442,569
DEVICES FOR PRODUCING VIRTUAL IMAGES
Filed Sept. 26, 1963
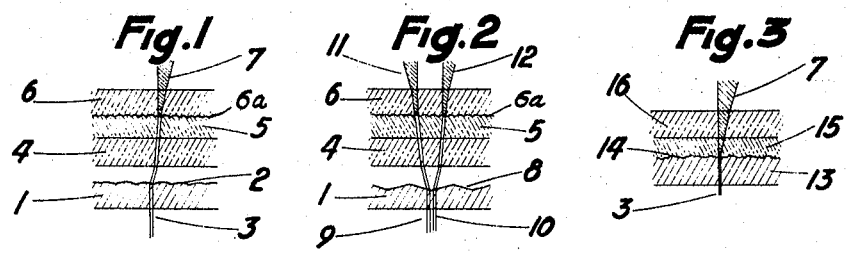
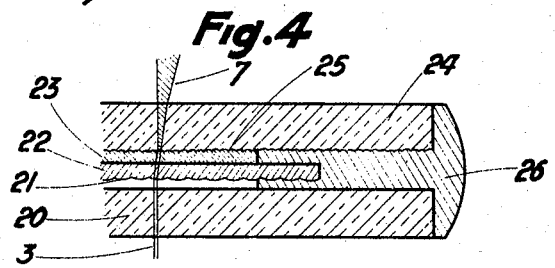
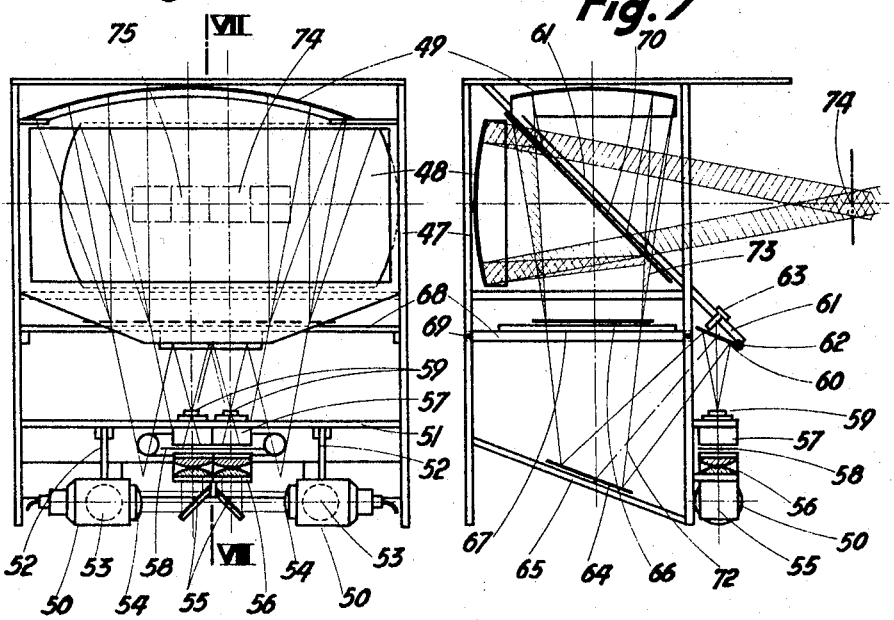
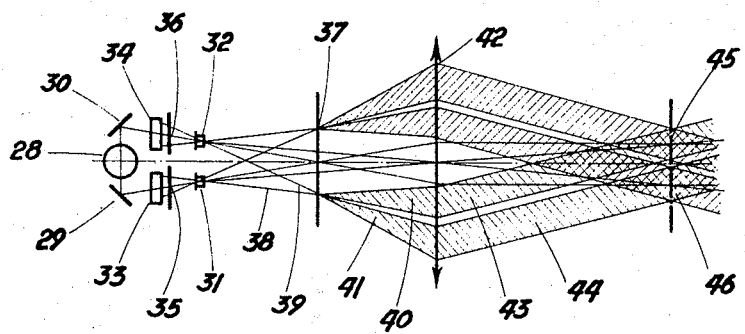
INVENTOR
MAURICE BONNET
BY
Albert C. Johnston
ATTORNEY

# United States Patent Office 3,442,569
Patented May 6, 1969

3,442,569
DEVICES FOR PRODUCING VIRTUAL IMAGES
Maurice Bonnet, Paris, France, assignor to Centre Nationale de la Recherche Scientifique, Paris, France, a corporation of France
Filed Sept. 26, 1963, Ser. No. 311,843
Claims priority, application France, Sept. 29, 1962, 910,818
Int. Cl. G02b 27/24, 27/00, 13/20
U.S. Cl. 350—137      11 Claims

ABSTRACT OF THE DISCLOSURE

A device for obtaining virtual images of objects such as films comprises a substantially punctual optical source, an objective, a transparent intermediate optical element acting by refraction and an optical ocular system, wherein said element comprises a glass or plastic plate having a surface formed with parallel straight cylindrical or prismatic grooves for angularly deflecting pencil beams incident to said element and such a plate having a minutely lenticular surface, such as a finely etched or ground surface, which is covered by a thin layer of liquid, such as a silicone oil, having an index of refraction differing from that of the lenticular plate, so that said beams emerge and pass to said ocular system in a widened pattern of conical beams respectively diverging at an angle of less than 20°.

---

The present invention relates to devices for obtaining virtual images of various objects and more particularly of films.

Various types of observation or viewing apparatus are known wherein an objective system provides a first image of a given object and an eyepiece arrangement gives the observer a virtual image of the first image.

In certain of such apparatus, an intermediate real image is formed on a diffusing screen, said image being then viewed by means of an eyepiece system consisting, for instance, of a large size lens.

Since however, each ray of the light is diffused at said diffusing screen into a relatively large solid angle, the degree of luminosity obtained with the device is substantially less than that obtained with the conventional ocular-objective system.

In principle, the function of such a diffusing screen does not differ from that of an ordinary opaque screen, except that this last mentioned screen operates by reflection.

It is known, on the other hand, that a serious drawback of the conventional observation systems lies in that the ocular circle has a very small diameter, resulting in the observer often having some difficulties in locating its position and holding on to it. As known, the so-called "ocular circle" in a system consisting of an objective and an eyepiece is the image of the objective mounting seen through the eyepiece, said image occurring in an area of maximum concentration of the light rays where the observer should place the pupil of his eye. In practice, the position of the ocular circle can be determined by moving a screen perpendicularly to the optical axis of the eyepiece, in the light beam issuing from the optical system. Under these conditions, a circular luminous spot is visible, the diameter of which passes through a minimum, obviously corresponding to a maximum brightness or brilliance.

It follows that, in practice, the observer will be able to examine the image with one eye only and that, in order to see it, he must assume a restricted position which may vary only within very close limits.

Devices have been disclosed which were adapted to modify the shape of the ocular circle in order to allow observation with both eyes, by utilization of a reading or observation screen formed with fine grooves or ribs onto which the magnified image is projected. The direct examination of such a screen does not however allow a perfectly sharp image to be perceived, since the grooves or ribs do not satisfy the required optical conditions.

The main object of the present invention is to provide a device which obviates the various above mentioned drawbacks and enables the shape of the ocular circle to be modified while increasing the dimensions thereof.

Instead of the customary term "ocular circle," we prefer to and will use hereinafter the more general expression "ocular area," since the area concerned is not necessarily circular.

According to the invention, a device adapted to provide virtual images of various objects and, more particularly, of films, comprises essentially at least one objective to produce a collection of pencil beams capable of forming an intermediate real image of an object, a thin transparent intermediate optical element being placed across the path of said collection of beams and presenting a structure such that it will convert each parallel or substantially parallel incident pencil beam into an emergent conically or pyramidally-shaped beam, of a well defined shape, the divergence of which is less than 20°, all the said conical or pyramidal beams being collected by an optical system providing a virtual image of the obect, said virtual image being observed at an ocular area, now enlarged corresponding to the objective; the form, position and dimensions of the vertical image being dependent upon the structure of said transparent intermediate optical element.

The ocular area thus enlarged according to the invention may be such that it will enable the observation of an identical image with both eyes. Thus, in this particular application, the invention considerably improves the observation conditions by simple means and consequently minimizes the observer's visual fatigue, while maintaining the optical qualities of the image observed.

A plurality of objectives, each corresponding to a definite object, may of course be used without departing from the scope of the invention. To each of the said objectives will correspond an ocular area distinct from the adjacent ocular areas, all the said areas being in the same plane. In particular, by slightly shifting his head, the observer will be able to inspect various fragmentary views of one and the same object, such as the successive opposed pages of a book, or various views, taken from different angles, of the same object.

The intermediate transparent optical element providing the enlarged ocular area may be formed of a glass plate one face of which is slightly etched by means of an acid, said plate being coated with a liquid or varnish having a refraction index differing from that of the plate, the difference between these two indexes, which may have a small value, being selected in such a manner as to obtain a predetermined divergence in the emergent conical beam, taking into consideration the configuration of the etched ("ground glass") surface. The size of the ocular area depends on the difference of the indexes of refraction and on the structure of the ethed surface.

The coated plate of the intermediate transparent optical element may also be a plate made of a plastic material on which the surface configuration of ground glass or of another similar surface is reproduced, for instance, by hot pressing.

When the plate is covered with a liquid, the said liquid may be one of the various silicone oils which have a wide variety of refractive indexes. The liquid can be held against the plate by means of a transparent plate of glass or a plastic material.

The intermediate transparent optical element may alternatively comprise a transparent plastic plate formed with spherically-shaped lenticular elements, and said lenticular elements may further present a surface micro-structure similar to that of ground glass, the essential condition being that the angle of divergence obtained be less than 20°.

An intermediate optical element giving conical divergent beams according to the invention, i.e., a "conical beam plate," such as a glass or plastic plate coated with a liquid or varnish as above described may be associated with a transparent plate having ribs or grooves on one of its faces, particularly cylindrically shaped ribs or grooves. The ocular area obtained then has an enlarged dimension in the direction perpendicular to that of the said ribs or grooves, and may thus be sufficiently enlarged, for instance, in the horizontal direction, to enable a binocular observation.

A further preferred embodiment of the invention consists in an observation device adapted to provide two enlarged ocular areas which are substantially identical and allow a binocular observation of the same image. The intermediate optical element of such a device comprises a conical beam plate, cooperating with a transparent plate having one of its faces formed with prismatic grooves or ribs adapted to deflect in a substantially symmetrical manner two adjacent parallel pencil beams the incident points of which are disposed on both sides of the same ridge, so that the angle of the emergent beams will correspond to the angular separation of the observer's eyes, taking into consideration the focal distance of the eyepiece lens.

According to an alternative embodiment, an observation device is provided having a substantially square or rectangular ocular area, or two such ocular areas, wherein the intermediate optical element comprises at least two superposed transparent plates formed with cylindrical grooves or ribs suitably directed in their plane, between which a conical beam plate is arranged, associated, if required, with a plate formed with prismatic grooves or ribs.

The two plates with cylindrical grooves or ribs may be arranged with their grooved or ribbed surfaces directed towards each other, the space between said plates being filled with a transparent liquid or varnish, having a suitable refractive index and capable of acting as an adhesive.

The width of the said grooves or ribs or of the lenticular elements of the intermediate optical element may be suited to the visual acuity of the observer, taking into consideration the focal distance of the eyepiece.

The plate or plates forming the intermediate transparent optical element may be curved to compensate for geometrical aberrations.

The intermediate optical element may comprise a plate formed with asymmetrical prismatical or cylindrical grooves or ribs providing an overall deflection of the pencil beams, particularly if, on account of space or other considerations, the objective is not centered relative to the observation axis.

A device enabling a three-dimensional observation of pairs of prints or of stereoscopic films may comprise two objectives arranged at a suitable distance on each side of the optical axis of the apparatus and providing, from the two elements of the considered stereoscopic pair two collections of beams capable of forming two images located in the same plane, an intermediate optical element of a suitable type having sufficient dimensions for covering the beams of both collections, and an ocular system formed of at least one lens or concave mirror collecting the major portion of the light transmitted by said intermediate optical element, in order to provide, in the observation zone, two distinct relatively large ocular areas.

The ocular system adapted for stereoscopic observation may consist of two concave mirrors arranged on both sides of a semi-reflecting plate, so as to form two dihedral angles of 45° with the latter and present a transversal shift corresponding to the angular distance.

A device adapted more particularly to the reading of micro-films may comprise, in accordance with the invention, an objective providing a collection of beams capable of forming an intermediate real image of said micro-film, an intermediate thin transparent optical element the area of which is close to the area occupied by the collection of beams and which is located across the path of said collection and adapted to convert each incident parallel or substantially parallel light beam into one or two emergent beams the divergence of which is less than 20°, and a semi-reflecting plate of sufficient dimensions which is located in the path of said emergent beams and coacts with a concave mirror. The semi-reflecting plate is inclined at an angle of 45° relative to the optical axis of the system, in such direction that it will direct half of the light flux onto the concave mirror to provide a final virtual image which is observable at an enlarged ocular area accommodating both eyes of the observer and presenting either the shape of a single elongated ocular area of, for instance, a rectangular form, or the shape of two distinct ocular areas suitably spaced apart and each in the form of a circle, a square or a rectangle.

The invention will be best understood from the following detailed description of illustrative embodiments, reference being had to the appended drawings wherein:

FIGURES 1, 2, 3, 4 are fragmentary cross-sectional views of several forms of intermediate optical elements for use according to the invention.

FIGURE 5 is a diagrammatic view of a device according to the invention adapted for a three-dimensional observation, the eyepiece used being a single refractive system.

FIGURES 6 and 7 represent, respectively, a front view and a cross-sectional view along line VII—VII of FIG. 6, of a device according to the invention wherein the occular system utilized comprises two concave mirrors.

According to FIGURE 1 which illustrates, in cross-section, an intermediate transparent optical element for use according to the invention, there is shown a plate 1 formed with grooves 2, through which passes an incident pencil beam 3. This pencil beam then crosses, successively, a plate 4 having parallel plane sides, a layer 5 of silicone oil having a suitable refractive index, and a glass plate 6 having a ground surface in contact with layer 5. The ground surface of plate 6 presents a microstructure of minute lenticular elements 6a in the path of the beams leaving the liquid layer 5.

The incident light pencil beam 3, with substantially parallel rays, is deflected by a groove of plate 1 to an angle determined by the position of the point of incidence on the groove. It then passes through plate 4 and layer 5 and is converted into a conical beam 7 upon passing through the ground down surface of plate 6. In order to obtain the desired enlarged ocular area, of elongated shape, the above described optical element is merely placed across the path of a collection of beams capable of forming intermediate real image.

To obtain a surface presenting cylindrical grooves such as 2, as shown in FIGURE 1, the following method may be used, this method being, moreover, adaptable for any other type of grooves.

The helical engraving is produced on a steel cylinder covered by a galvanoplastic copper sheet, by means of a diamond tool of either circular or angular shape, according as the grooves are to be cylindrical or prismatic.

After engraving, the cylinder is protected with a corrosion-proof deposit, of nickel for instance, and is used to emboss a sheet of plastic material under heat and pressure. By way of example, cellulose triacetate may be perfectly embossed at a temperature of 80° C., under a pressure of 25 kg./sq. mm.

The embossing may also be effected by means of a heating plate press, use being made in this case of a rectangular, plane matrix instead of a cylinder. The said plate is, for instance, obtained by covering the cylinder with a copper sheet, which after engraving is removed and unrolled.

According to the invention, it is also possible to provide a transparent plate one face of which has the property of spreading out the pencil beams, as does a ground down glass, while also formed with the desired cylindrical or prismatic grooves. To obtain such a plate, the above mentioned steel cylinder after having been suitably engraved, is covered with a galvanoplastic coating providing large-size crystals of the metal used (an alkaline copper bath, for instance, without addition of metal refining agents). The treatment is stopped when the image of a light spot given by the initially reflecting surface of the cylinder blurs out completely. A similar result may also be obtained by etching the surface of the cylinder with a suitable acid solution. The die thus obtained is then used to mould a plate of a transparent material. This method does not however exclude the use of a liquid or varnish for adjusting, as hereinabove mentioned, the divergence angle of two parallel pencil beams. In this case, account must be taken, when calculating the radius or the angle of the tool forming the grooves, of the fact that the optical action of the grooves is modified.

In FIGURE 2 there is shown an alternative embodiment of an intermediate optical element, which essentially differs from that shown in FIGURE 1 by the fact that the cylindrical grooves are substituted by prismatic grooves 8. Under these conditions, two adjacent incident pencil 9 and 10, are deflected, one towards the left, the other towards the right, providing at the outlet of the plate two sharply differentiated conical beams 11, 12. This "conical beam plate" arrangement thus provides, at the output of the device, two enlarged ocular areas which are substantially identical.

FIGURE 3 shows, in cross-section, a further alternative embodiment of the intermediate optical element according to the invention. A first plate 13 is provided on its inner face 14 with grooves of the surfaces of which have the configuration of ground glass. Surface 14 is covered with a layer 15 of silicone oil which is maintained in place by a transparent plate 16.

Such an optical element provides an elongated ocular area similar to that supplied by the element of FIGURE 1. This is also true of the element shown in FIGURE 4, wherein the incident parallel pencil beam 3 passes successively through a protecting transparent glass plate 20, the grooved surface 21 of a transparent plate 22, a silicone oil layer 23 and a glass plate 24 formed with a ground surface 25. The space between the grooved surface 21 and the protective plate 20 may, if desired, be filled up with silicone oil or with any other suitable liquid. The various media forming the optical element of FIGURE 4 are secured together by means of a mass 26 of a resin such as that sold under the registered trademark "Araldite."

According to the invention, one of the intermediate optical elements illustrated in FIGURES 1, 3 and 4 may be used in the construction of an optical system for observing films, by means of which, for each view of a stereoscopic couple, a well differentiated ocular area may be obtained and, consequently, a three dimensional vision, as will be shown in more detail in the two following illustrative examples.

As shown in FIGURE 5 there is provided a projection lamp 28 emitting two diametrically opposed light beams which are reflected by two mirrors 29 and 30 and focussed on two objectives 31 and 32 by means of condensers 33 and 34. Two stereoscopic views 35 and 36 are placed in such a manner that collections of beams corresponding to their images passed through objectives 31 and 32 are located in a same plane 37 containing an intermediate optical element according to the invention, which element converts each pencil beam, such as beam 38 and 39, into conical beam such as beam 40 or 41. The conical beams reach an eyepiece lens 42 which converts them into parallel beams such as beams 43, 44, the observation being assumed to take place at infinity. These resultant beams taken together then define distinct ocular areas such as 45 and 46.

The arrangement just described enables film pairs to be used by reversing the films and spacing them apart by a distance which may be calculated knowing the focal distance of the eyepiece and the focal distance of the projection objectives.

In the further embodiment of FIGURES 6 and 7 a framework 47 supports an elongated vertical concave mirror 48 and an elongated horizontal concave mirror 49. The said two mirrors have their planes of symmetry arranged parallel to, but slightly displaced on either side respectively of to the plane of symmetry of the system indicated by line VII—VII. Two light projectors 50, secured on a cross-bar 51 by means of rods 52, each comprising a lamp 53 and a condenser 54, form the illuminating system of the assembly. Two mirrors 55 inclined at an angle of 45° to the common optical axis of said light projecting devices are respectively fixed to two condensers 56, the optical axes of which are perpendicular to said common axis. A film carrier 57 enables the stereoscopic film pair 58 to be observed. Two adjustable objectives 59 are fitted on said fim carrier, the assembly being secured on cross-beam 51. The optical axis of each of said objectives 59 lies in the plane of symmetry of one of the concave mirrors 48 and 49 respectively.

Two plane mirrors 60 are mounted for adjustment about a horizontal axis 62 on a cross-bar 61 fixed to frame 47, and the position of said mirrors 60 may be adjusted by means of a screw 63.

Mirrors 60 receive the light beams issuing from condensers 54 respectively and reflect said beams onto a plane mirror 64 secured on a cross-bar 65. Each reflected beam then passes through an intermediate optical element 66 of the type described with reference to one of FIGURES 1, 2, 3 and 4, which element is secured on a frame 67. Said frame 67 is carried on cross-bars 68 which may be moved vertically in frame 47 for adjustment purposes and which are held in the desired position by means of screws 6 9. A semi-reflecting plate 70 is arranged above said plate 66 at an angle of 45° with respect to the optical axes of both of the concave mirrors 48 and 49. The device operates as follows:

Considering the light beams issued from light projector 50 located at the right-hand side of FIGURE 6, the said beam will be reflected on the corresponding mirror 55 and will pass through the right-hand condenser 56, then through the right-hand view on film 58 and reach the right-hand objective 59. Said objective 59 is so adjusted that it will provide a real image of the film on optical element 66. Said element converts each incident parallel pencil beam 72 into a conical emergent beam 73, as explained hereinabove. The total assembly of beams 73 is partially reflected on semi-reflecting plate 70, then on concave mirror 48, reflected back through plate 70 and is focussed in an observation zone 74, thus forming a first ocular area. A secondary ocular area is produced adjacent the first, by the action of concave mirror 49 on the light beam passing directly through plate 70.

The focal distance of mirror 48 is selected in such a manner that by placing the right eye at 74, a virtual image is observed at the desired distance of the real image formed on element 66 by the right-hand objective 59. The focussing is obtained by raising or lowering frame 67 and by adjustment of said objective 59.

Considering now the light beam issuing from light projector 50 at the left of FIGURE 6, the images relating thereto are formed in the same manner as described hereinabove with respect to that issuing from the right hand side projector with the difference that the conical beams issuing from the intermediate optical element 66 passing through semi-transparent plate 70 and reflect on horizontal concave mirror 49, then again on plate 70, before focussing in the observation zone where said beams form a new ocular area 75 similar to 74, but shifted in relation thereto by the mean distance between the eyes, i.e. about 60 to 70 mm. In the same way as for the right-hand objective, a secondary outer ocular area also formed adjacent the area 75, derived from the action of mirror 48 on the beam which, initially, has been reflected by plate 70. The dimensions of plane mirros 55, 60 and 64 and those of concave mirrors 48 and 49 are dependent upon the desired field, and the focal distances of objectives 59 and concave mirrors 48 and 49 are dependent upon the desired magnification. The mirrors may be of aluminized glass, but it may be more advantageous, especially in the case of mass production, to use a metallized plastic material, particularly for making the concave mirrors.

Four ocular areas are thus obtained, each view on the film having one related ocular area corresponding to each concave mirror. Said areas are diagrammatically indicated by rectangular profiles in FIGURE 6. The intermediate optical element 66 must be made such that the said ocular areas do not overlap each other and that the spacing between areas 74 and 75 corresponds to the distance between the eyes of the observer. The two secondary outer ocular areas need not be used in practice.

The above described arrangement has the advantage of providing an orthogonal projection for each eye. It enables a pair of stereoscopic photographic views to be observed directly, without reversing the images.

Of course, if a conventional cinematographic arrangement is resorted to, instead of film-carrier 57, a three-dimensional colour film may also be observed.

In the above described arrangement, each eyepiece system comprises a concave mirror, but this is not essential. As shown at FIGURE 5 use may be made of a single lens for forming both of the virtual images. According to another modification one or more lenses may be associated with each of the concave mirrors of FIGURES 6 and 7 to increase the field of the apparatus and reduce the aberrations.

What we claim is:

1. An apparatus for obtaining virtual images of photographic films or like objects, comprising means including at least one objective to produce a collection of pencil beams capable of forming an intermediate real image of the object, an intermediate platelike transparent optical element arranged across the path of said collection of beams, said element comprising a transparent plate surface presenting across said path straight parallel optical grooves for deflecting adjacent ones of said beams angularly in directions perpendicular to the lengths of said grooves, said element also comprising a transparent plate having a surface formed with a microscructure of minute lenticular elements constituting means for converting said pencil beams into emergent conical or pyramidal light beams having a definite pattern and respectively having a divergence angle of less than 20°, and means for collecting and directing said emergent conical or pyramidal beams into an observable virtual image of said object, said virtual image occupying an ocular area substantially enlarged in relation to the area of said objective.

2. An apparatus according to claim 1, said microstructure having substantially the form of a ground glass surface, and said element comprising a transparent coating on said microstructure, said coating having a refractive index sufficiently different from that of said plate that a beam incident to said element is bent angularly by said coating.

3. An apparatus according to claim 2, said transparent plate being a thin glass plate having an acid-etched surface constituting said microstructure.

4. An apparatus according to claim 2, said transparent plate being a thin transparent plate of plastic material, having one surface thereof molded to substantially the form of a ground glass surface.

5. An apparatus according to claim 2, said coating being a thin layer of a liquid held against said microstructure by a superimposed transparent plate of glass or a plastic material.

6. An apparatus according to claim 5, said liquid comprising a silicone oil having said different refractive index.

7. An apparatus according to claim 1, said intermediate optical element comprising superposed thin transparent plates at least one of which is formed over one of its sides with said grooves, said microstructure having substantially the form of a ground glass surface on the inner side of one of said plates and, held between two of said plates in contact with said microstructure, a transparent layer of a liquid having a refractive index sufficently different from that of said plates that a beam incident to said element is bent angularly by said liquid layer.

8. An apparatus according to claim 7, said grooves being substantially cylindrical grooves.

9. An apparatus according to claim 7, said grooves being prismatic grooves.

10. An apparatus according to claim 1 for viewing pairs of stereoscopic films, comprising means including two objectives spaced apart on opposite sides of an optical axis for producing two collections of pencil beams capable of forming in a common plane two intermediate images respectively of the two fiims of a stereoscopic pair, an intermediate transparent optical element as aforesaid having sufficient area to cover the path of the beams of both said collections, and collecting and directing means as aforesaid including at least one lens and at least one concave mirror for collecting the major portion of the light beams emergent from said intermediate optical element and directing the collected light of said emergent beams into two virtual images observable binocularly in two distinct ocular areas.

11. An apparaus according to claim 1 for viewing pairs of stereoscopic films, comprising means including two objectives spaced apart on opposite sides of an optical axis for producing two collections of pencil beams capable of forming in a common plane two intermediate images respectively of the two films of a stereoscopic pair, an intermediate transparent optical element as aforesaid having sufficient area to cover the path of the beams of both said collections, said collecting and directing means comprising two concave mirrors respectively positioned on opposite sides of a semi-reflecting plate so as to form two dihedral angles of 45° with the latter and produce from said emergent beams two virtual images of said films which are observable binocularly, with a lateral separation of said virtual images.

References Cited

UNITED STATES PATENTS

| 2,589,014 | 3/1952 | McLeod | 88—1.5 |
| 2,782,681 | 2/1957 | Copeland | 350—138 |
| 2,846,918 | 8/1958 | Miles | 350—213 |
| 2,891,444 | 6/1959 | Ewald | 350—131 |
| 3,003,387 | 10/1961 | Schiele | 350—9 |

RONALD L. WIBERT, *Primary Examiner.*

O. B. CHEW II, *Assistant Examiner.*

U.S. Cl. X.R.

350—167. 188